(12) United States Patent
Van Sant et al.

(10) Patent No.: US 6,503,163 B1
(45) Date of Patent: Jan. 7, 2003

(54) PRECISION CABLE DRIVE

(75) Inventors: Glen Van Sant, Langhorne, PA (US); Christopher John Killion, Huntingdon Valley, PA (US); Joseph Freeman Spangler, III, Chesilhurst, NJ (US)

(73) Assignee: Sensar, Inc., Moorestown, NJ (US)

( * ) Notice: Subject to any disclaimer, the term of this patent is extended or adjusted under 35 U.S.C. 154(b) by 0 days.

(21) Appl. No.: 09/467,625

(22) Filed: Dec. 20, 1999

Related U.S. Application Data

(63) Continuation-in-part of application No. 09/224,554, filed on Dec. 31, 1998, and a continuation-in-part of application No. 08/980,266, filed on Nov. 28, 1997, now Pat. No. 6,005,704, which is a continuation-in-part of application No. 08/648,324, filed on May 15, 1996, now Pat. No. 5,717,512.

(51) Int. Cl.$^7$ ................................................. F16H 7/08
(52) U.S. Cl. ..................................................... 474/101
(58) Field of Search .............................. 474/64, 65, 68, 474/87, 89, 101, 117; 74/10.7, 89.22; 242/481.4

(56) References Cited

U.S. PATENT DOCUMENTS

| | | | | |
|---|---|---|---|---|
| 2,661,492 A | * | 12/1953 | Oishei | ......................... 15/253 |
| 4,070,089 A | | 1/1978 | Grafton | |
| 4,116,568 A | * | 9/1978 | Suzuki et al. | ............... 400/320 |
| 4,623,100 A | * | 11/1986 | Tremblay | ................. 242/25 R |
| 5,102,373 A | * | 4/1992 | Martinson et al. | .......... 474/101 |
| 5,353,466 A | * | 10/1994 | Smith et al. | ............ 15/250.003 |

FOREIGN PATENT DOCUMENTS

| | | | | |
|---|---|---|---|---|
| JP | 60-114440 | * | 6/1985 | ............ B23Q/5/28 |
| JP | 6-174038 | * | 6/1994 | ........... F16H/19/02 |

OTHER PUBLICATIONS

Spectra Fiber 900, 1000, Allied Signal, Inc., 1999.
Spectra Fiber 2000, Allied Signal, Inc., 1999.

* cited by examiner

Primary Examiner—David A. Bucci
Assistant Examiner—Vicky A. Johnson
(74) Attorney, Agent, or Firm—Woodcock Washburn LLP

(57) ABSTRACT

The precision cable drive system of the present invention consists generally of a frame upon which is mounted the components of the drive. These include a motor having a drive shaft, a plurality of idler pulleys, a tensioner, and a drive pulley, to which the object being rotated is connected. A cable composed of woven polymer fibers is wrapped around the shaft of the motor and is stretched around the idler pulleys, the tensioner and the drive pulley. The drive is capable of rotating the drive pulley, and the load attached to it, by fractions of a degree, without play between the motor shaft and the drive pulley. The drives are used in a compact image steering device to rotate cameras and illuminators about two axis of rotation.

64 Claims, 5 Drawing Sheets

PRECISION CABLE DRIVE

CROSS REFERENCE TO RELATED APPLICATIONS

This application is a continuation-in-part of pending U.S. patent application Ser. Nos. 09/224,544 filed on Dec. 31, 1998, and 08/980,266, filed on Nov. 28, 1997, now U.S. Pat. No. 6,005,704, which is a continuation-in-part of U.S. patent application Ser. No. 08/648,324, filed on May 15, 1996, now U.S. Pat. No. 5,717,512.

BACKGROUND OF THE INVENTION

1. Field of the Invention

The invention relates to a device for providing precise rotational motion to components of a device for intelligently directing light to a particular object in a scene and then directing the light reflected from the object into an imaging camera.

2. Background of the Invention

There are several methods, known as biometrics, used for verifying or recognizing the identity an individual. Biometric methods include analyzing a signature, obtaining and analyzing an image of a fingerprint and imaging and analyzing the retinal vascular patterns of a human eye. Recently, the art has used the iris of the eye, which contains a highly detailed pattern that is unique for each individual and stable over many years as a non-contact, non-obtrusive biometric. This technique is described in U.S. Pat. No. 4,641,349 to Flom et al. and U.S. Pat. No. 5,291,560 to Daugman. The iris identification techniques disclosed by Flom and Daugman require a clear, well-focused image of the iris portion of the eye including a well defined iris sclera boundary.

Prior to the invention described in the above-referenced, related applications and U.S. Pat. No. 5,717,512 to Chmielewski et al, there had not been an optical system which could rapidly acquire a sufficiently clear, properly aligned image of an iris of the person to be identified unless that person positioned his eye in a fixed position relatively close to an imaging camera and performed a self alignment and focus process. Such a system was introduced in those disclosures. Ideally, this system should be as unobtrusive as possible, requiring little or no cooperation by the user (except for looking in the right direction). This type of system is particularly useful in the verification of users of automated teller machines (ATMs), as well as individuals seeking access to a restricted area or facility or other applications requiring user identification.

Any optical system for iris identification of ATM users must be able to rapidly capture a clear image of the iris of the person using the automated teller machine and have the capability of performing the related processing needed for user verification or recognition. Further, such a system, especially if it is to be integrated into the ATM, must be compact in size.

In our U.S. Pat. No. 5,717,512 we describe a compact image steering and focusing device having three cameras and a tilting frame on a flat base. The tilting frame contains a pan/tilt mirror, lens system, focus motor, and pan and tilt cable drive systems, all of which can direct the field of view seen by one of the cameras. The other two cameras are mounted in fixed locations. The illuminators are also fixed and provide illumination sufficient to image an iris anywhere in the defined working volume. Although this device works well, it has limitations which prevent it from covering a larger imaging volume (i.e., one that is sufficient to image users ranging from the average 7 year old to the 95th percentile male as well as wheelchair bound individuals) in a cost effective manner. A device solving this problem was disclosed in related and copending U.S. patent application Ser. No. 09/224,544. This application focuses on certain components of that system, in particular, the precision cable drive systems used to move the apparatus about the tilt axis, to move the pan mirror about the pan axis, and to move the narrow field-of-view illuminators from side to side.

SUMMARY OF THE INVENTION

The compact image steering device disclosed in the related application can obtain a clear image of a small region on an object located in a volume bounded by an angle of 82 degrees in the vertical, an angle of 58.5 degrees in the horizontal and a radial distance from 14 inches to 30 inches in front of the optical system. The system includes a tiltable frame which carries the pan mirror and at least one camera. The position of this frame is controlled by a precision cable drive system located in the rear of the device and connected to the frame by an extended cable. Light reflected from the object of interest is captured by the mirror and directed to another camera which may or may not be on the tilting frame. Another precision cable drive system rotates the pan mirror about the pan axis. The tilt axis is substantially perpendicular to the pan axis of the mirror. The combined tilting of the frame and rotation of the pan mirror allows the mirror to be steered to any location in the imaging volume. In a preferred embodiment, a narrow field of view (NFOV) camera receives the light reflected from the pan/tilt mirror.

Two cameras are provided on the tilting frame to obtain two spatially separated but time concurrent wide field of view (WFOV) images of the subject. Images from these cameras are processed to determine the coordinates of the specific location of interest, such as the face and eyes of a person to be identified. Based upon an analysis of those images, the tilt axis and pan axis are positioned so that the mirror is adjusted to receive light reflected from the iris or other area of interest and direct that reflected light to a NFOV camera and lens system. The NFOV lens system and camera produces an image of sufficient size and quality to permit iris identification.

Illumination for the WFOV cameras is provided by attaching at least one illuminator to the tilting frame. This first illuminator is aligned so that the center axis of its respective beam pattern is parallel to the optical axis of the WFOV cameras. The beam pattern is designed so that it provides sufficient illumination coverage for the area imaged by the WFOV cameras and optics. As the tilt axis is moved up and down by the tilt axis cable drive system, the camera and illumination can image users at various heights.

NFOV illumination is provided by two illuminators which are disposed on opposite and extreme ends of the tilting frame. These illuminators' beam patterns are significantly smaller than the WFOV illuminators beam pattern. The optical axis of these two illuminators form a plane through which the optical axis of the of the NFOV camera moves as it pans. Thus the light is directed only to the area of interest (as defined by the field of view of the NFOV camera) and energy is not wasted by illuminating an area larger than necessary The NFOV illuminators may be provided with a rotational degree of freedom so that they are able to rotate in the same direction as the pan axis. In this case, the beam pattern of one or both illuminators is steered to coincide with the location of the imaging area of the NFOV camera, as defined by the pan and tilt axes. The rotation of the illuminators is controlled via a pair of precision cable drive systems.

A control system is provided to analyze the images from the wide field of view camera and thereby specify the location of a point or area of interest on the object or person being identified. The control system provides synchronization and timing between cameras and illuminators as well and intensity control for the illuminators.

DETAILED DESCRIPTION OF THE PREFERRED EMBODIMENTS

Figure 1:
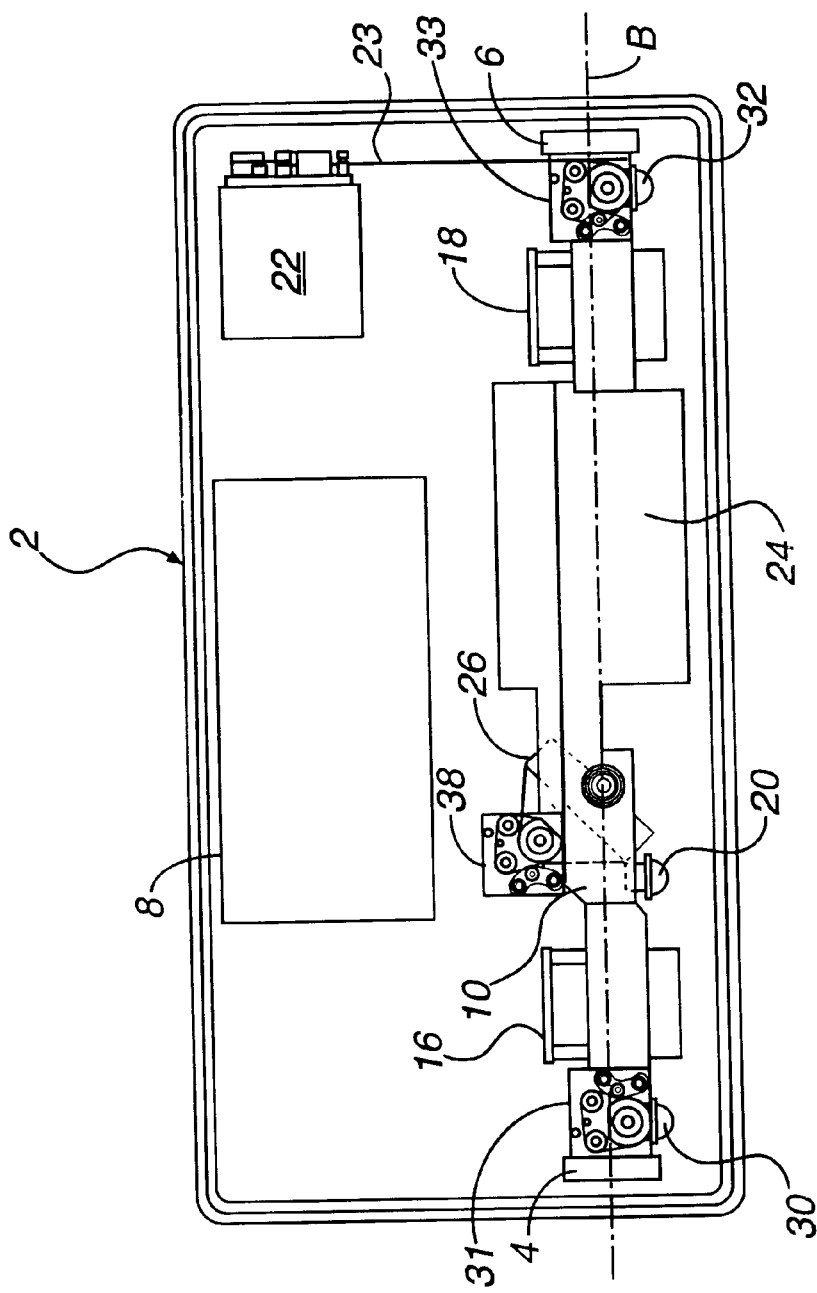
FIG. 1 is a top plan view of an image steering device utilizing the precision cable drives of the present invention.
Figure 2:
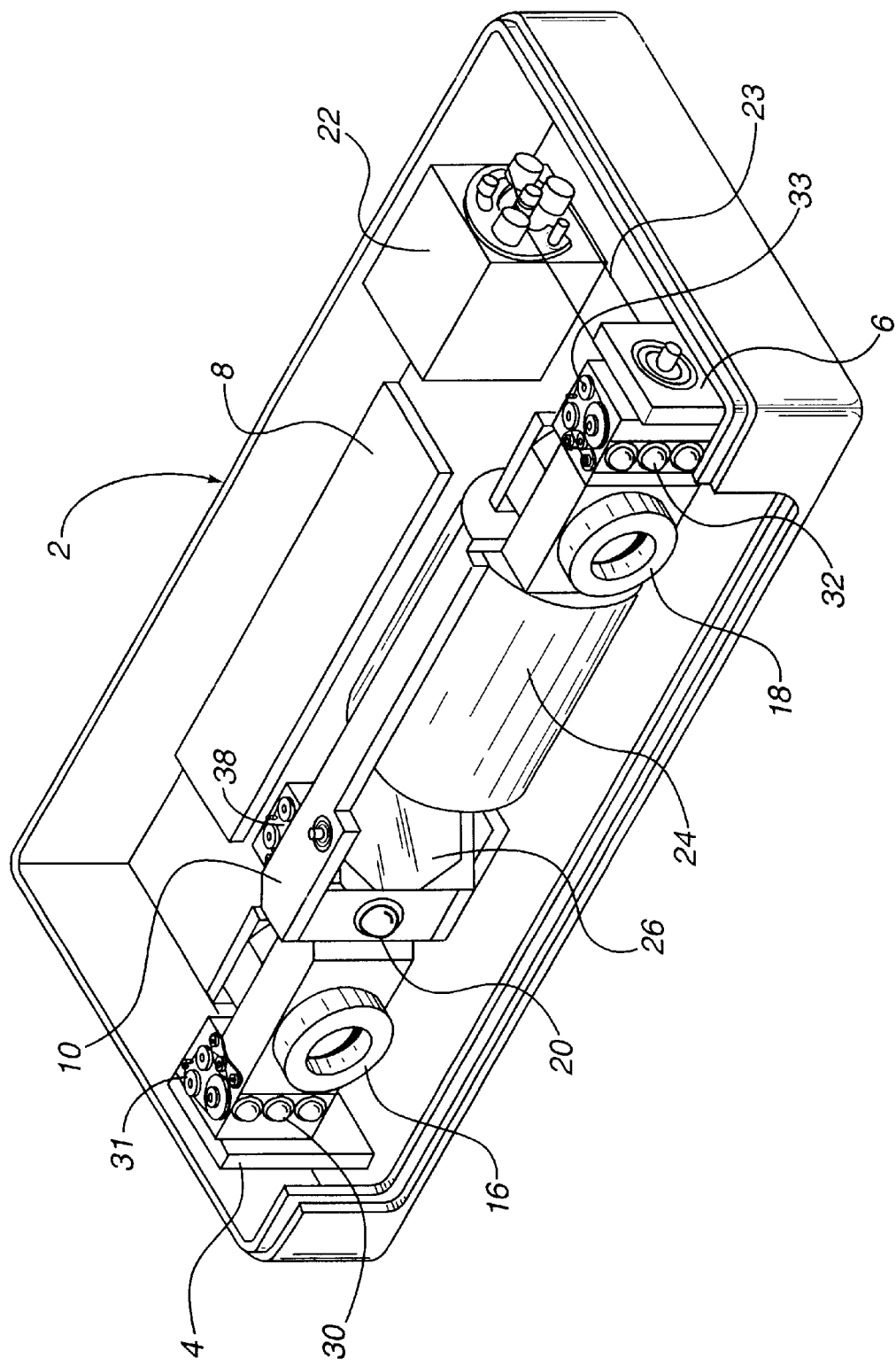
FIG. 2 is a front perspective view of the image steering device of FIG. 1.

When used for iris identification, the optical system and cameras in the imaging device shown in FIGS. 1 and 2 are required to perform under computer control, provided by PC board 8. The circuit board contains the electronics, interfaces and computer chips that are needed to control the mechanisms, cameras and illuminators.

In the preferred embodiment, a narrow field-of-view (NFOV) camera assembly 24 is mounted on frame 10 in optical alignment with pan/tilt mirror 26. A pair of wide field-of-view (WFOV) cameras 16 and 18 are provided on opposite ends of frame 10. The centerline of the WFOV cameras 16 and 18 and the centerline of the NFOV camera 24 lie in the same plane, which rotates as the frame 10 is rotated about tilt axis B. The frame is rotated by tilt precision cable drive system 22, which is connected to frame 10 through drive belt 23, to allow rotation of frame 10 about tilt axis B.

The movement of pan mirror 26 corresponds to the horizontal motion of a user in front of the ATM, while the movement of frame 10 directs the optical axes of the cameras to compensate for the height of the head and eye of the subject being imaged. The NFOV camera assembly 24 has a field-of-view which overlaps a subset of the field-of-view seen by the fixed focus WFOV cameras 16 and 18.

The system first attempts to determine the location of the subject's head, face and eyes using the wide field-of-view (WFOV) cameras 16 and 18. The subject is illuminated using WFOV illuminator 20. WFOV cameras 16 and 18 and WFOV illuminator 20 are mounted on frame 10. Frame 10 is mounted on supports 4 and 6, and can rotate about horizontal axis B under control of precision cable drive 22 to accommodate subjects of varying height.

Once the location of the subject's left or right eye are known, narrow field-of-view (NFOV) camera 24 attempts to image the subject's iris. Light from the subject's eyes is reflected by pan/tilt mirror 26 and into the lens of the NFOV camera 24. Pan/tilt mirror 26 is rotated about a vertical axis which is perpendicular to tilt axis B by precision cable drive 38. The combination of the rotation of both frame 10 and pan mirror 26 allows the optical axis of the NFOV camera to be centered on the subject's eye.

Being able to rotate the pan/tilt mirror 26 around the pan axis and tilt axis B allows the field of view of the NFOV camera 24 to be directed along the pan (left to right) and tilt (up and down) axes. The center of the optical axis passing through the focusing lens intersects with the center of the pan/tilt mirror. The use of pan/tilt mirror 26 has the effect that the optical range is twice the mechanical range.

There are two separate but related illumination requirements for this system: WFOV illumination and NFOV illumination. Illuminator 20 mounted near pan/tilt mirror 26 is used to provide illumination for WFOV cameras 16 and 18. The beam pattern from the WFOV illuminator need only provide a slightly larger vertical range than the vertical range of the field-of-view of WFOV cameras 16 and 18. As WFOV cameras 16 and 18 move with the tilting of frame 10, WFOV illuminator 20 also moves, thereby providing coverage to the areas being imaged by the cameras.

The two outer illuminators 30 and 32 are used for NFOV illumination. In the preferred embodiment, NFOV illuminators 30 and 32 are mounted so that they can be rotated in the pan direction in order to direct their beam pattern to the location defined by the pan axis of pan/tilt mirror 26. In this implementation, NFOV illuminators 30 and 32 are driven by precision cable drive systems 31 and 33 respectively. This approach allows the higher power NFOV illuminators 30 and 32 to be concentrated in a small area and directed to the region of interest, such as the subject's eye location.

In another embodiment of the device, NFOV illuminators 30 and 32 are fixed and have a beam pattern that covers the horizontal range and a vertical range slightly larger than the field of view of NFOV camera 24. In this way once the tilt axis is positioned, NFOV camera 24 may be panned to any location and receive sufficient reflected light from the subject's iris to obtain a quality iris image.

The precision cable drive systems, which are the primary object of this disclosure, provide precise control over the movement of various components of the imaging system, which include as described above, the tilting of frame 10 about tilt access B, the rotation of pan/tilt mirror 26 about the pan axis and the rotation in the horizontal direction of NFOV illuminators 30 and 32. The precision cable drive systems allow micro-movements of the various components down to approximately $\frac{1}{100}$ of 1°. Additionally, the drives must be able to provide this performance in various temperature and humidity conditions, and without any "play" between the various components of the drive system.

A present preferred embodiment of the precision cable drive used as described above is shown in FIGS. 3 and 4 and consists essentially of rigid frame 40 upon which the various components of the drive are mounted. In particular, motor 42 is mounted on one side of the frame and shaft 44 of motor 42 protrudes through an opening in frame 40. One or more idler pulleys 46 are mounted on the opposite side of the frame and are tangentially aligned in a straight line with shaft 44 of motor 42. Drive pulley 48 is connected to the object being rotated, in this case, frame 10, pan/tilt mirror 26 or NFOV illuminators 31 or 33.

Drive pulley 48 may or may not be mounted to frame 40. For instance, in the case of the compact imaging device described above, precision cable drive system 22, which rotates frame 10 about tilt axis B, is mounted near the back of enclosure 2 while frame 10 is near the front. Therefore, drive belt 23 extends from precision cable drive system 22 across the device to frame 10, where it extends around drive pulley 48. This embodiment is shown in FIG. 5. Other precision drive systems used in the compact imaging device, such as drive 38 to rotate pan/tilt mirror 26 and drives 31 and 33 to rotate the NFOV illuminators 30 and 32, shown in FIGS. 3 and 4, have drive pulley 48 mounted directly on frame 10.

Cable 50 is stretched in a path around drive pulley 48, idler pulleys 46 and the shaft 44 of motor 42. Tensioner 52 is utilized in the preferred embodiment to place tension on cable 50 to keep it in place on the various components of the precision cable drive system and to remove any slack in the cable. This eliminates any lost motion between the motion of shaft 44 and drive pulley 48. Tensioner 52 is mounted to adjustment plate 55, which is rotatably mounted to frame 40. The tension on cable 50 is adjustable by altering the position of tensioner 52 relative to cable by loosening nut 56 and rotating tensioner 52 and adjustment plate 55 about rotation point 58, then re-tightening nut 56. The tension placed on cable 50 can be set by utilizing a torque wrench on rotation point 58.

Cable 50 is preferably composed of a woven polyethylene fiber having an ultra-high molecular weight. The polyethylene fiber will preferably have an elongation of less then or equal to 5% and a density at least 0.95 grams per cubic centimeters. Such cables are sold under the trade name SPECTRA® 2000 by AlliedSignal Inc. In the preferred embodiment a 0.01 inch diameter cable is utilized. This material possess a high tensile strength which allows it to be wrapped on a pulley having a diameter much smaller than could be tolerated by a steel cable of similar diameter. Additionally, the cable material is highly resistant to abrasion and has a low coefficient of thermal expansion. Preferably, the cable is wrapped multiple times around shaft 44 of motor 42 to prevent slippage.

It is desirable that idler pulleys 46 be aligned in a line tangent to both idler pulleys 46 and shaft 44 of motor 42, with shaft 44 being positioned between idler pulleys 46. This relieves any radial forces on shaft 44 which may otherwise be imparted by the tension of the cable, and thereby reduces wear and tear on the motor bearings.

Also, in the preferred embodiment it is not necessary for the precision cable drive system to rotate a full 360° in either direction. Therefore, the ends of cable 50 are connected to drive pulley 48 at a point which will allow the drive pulley to be rotated approximately 320°. The preferred method of connecting the ends of cable 50 to drive pulley 48 consists of post 52 which is mounted perpendicular to the plane of drive pulley 48, where both ends of cable 50 are tied to post 52, preferably using an overhand looped knot. Extending from the circumference of the drive pulley is one or more barbs 54 which prevent cable 50 from slipping off of the circumferential edge of drive pulley 48.

Frame 40 of the precision cable drive system may be composed of any rigid material. However, in the preferred embodiment, frame 40 is composed of aluminum or plastic.

Idler pulleys 46 are held in a perpendicular relationship to frame 40 by one or more bearings (not shown) such that when idler pulleys 46 are stressed by the tension on cable 50, they will not vary from their perpendicular orientation with respect to frame 40.

Various types of motors 42 can be used with precision cable drive systems including a stepper motor or a servo motor wherein a feedback control system is utilized. In the preferred embodiment, such a feedback control system utilizes one or more incremental encoders, thereby allowing drive pulley 48 to moved in minimum increments of approximately 1/10 of 1° in either direction. The ratio of the rotation of motor shaft 44 to drive pulley 48 can be any desired ratio depending upon the relative sizes of the various components, however, in a preferred embodiment the ratio is approximately 10 to 1.

During manufacture, the precision cable drive systems are subjected to a run-in time period wherein cable 50 is tensioned and run through several iterations of use. After a period of time, cable 50 will have elongated due to the tightening of the fibers of woven polyethylene, and must thereafter be re-tensioned. Once cable 50 is re-tensioned, it will not be necessary to retension cable 50 at any point in the future. It is also important to note that cable 50 is resistant to variations in temperature and humidity, which is a necessity for any application such as the present one in which the unit may be exposed to a range of temperatures and humidity conditions, to prevent slippage which may cause "play" between drive shaft 44 and drive pulley 48.

Figure 3:
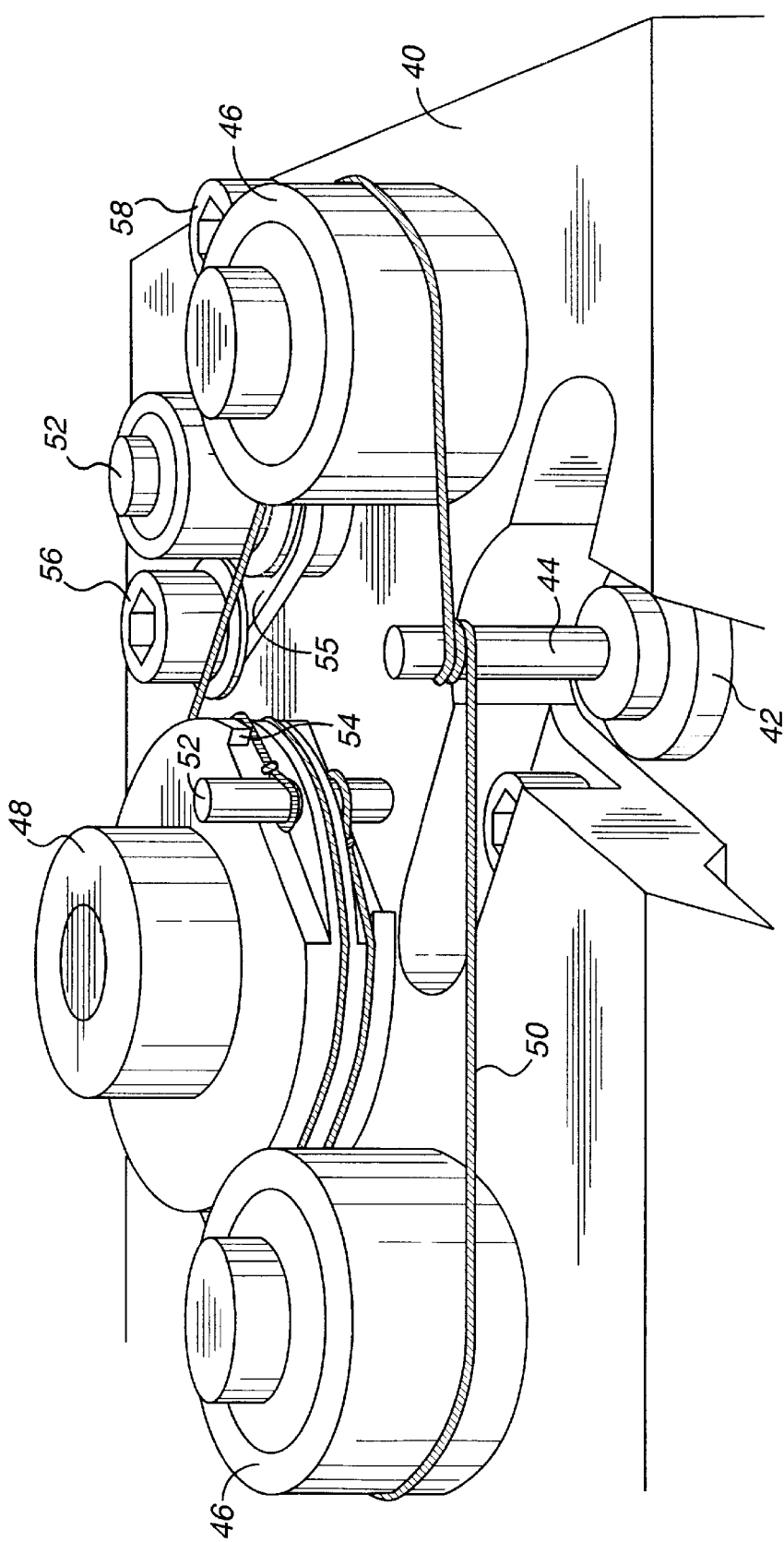
FIG. 3 is a perspective view of a present preferred embodiment of the precision cable drive.
Figure 4:
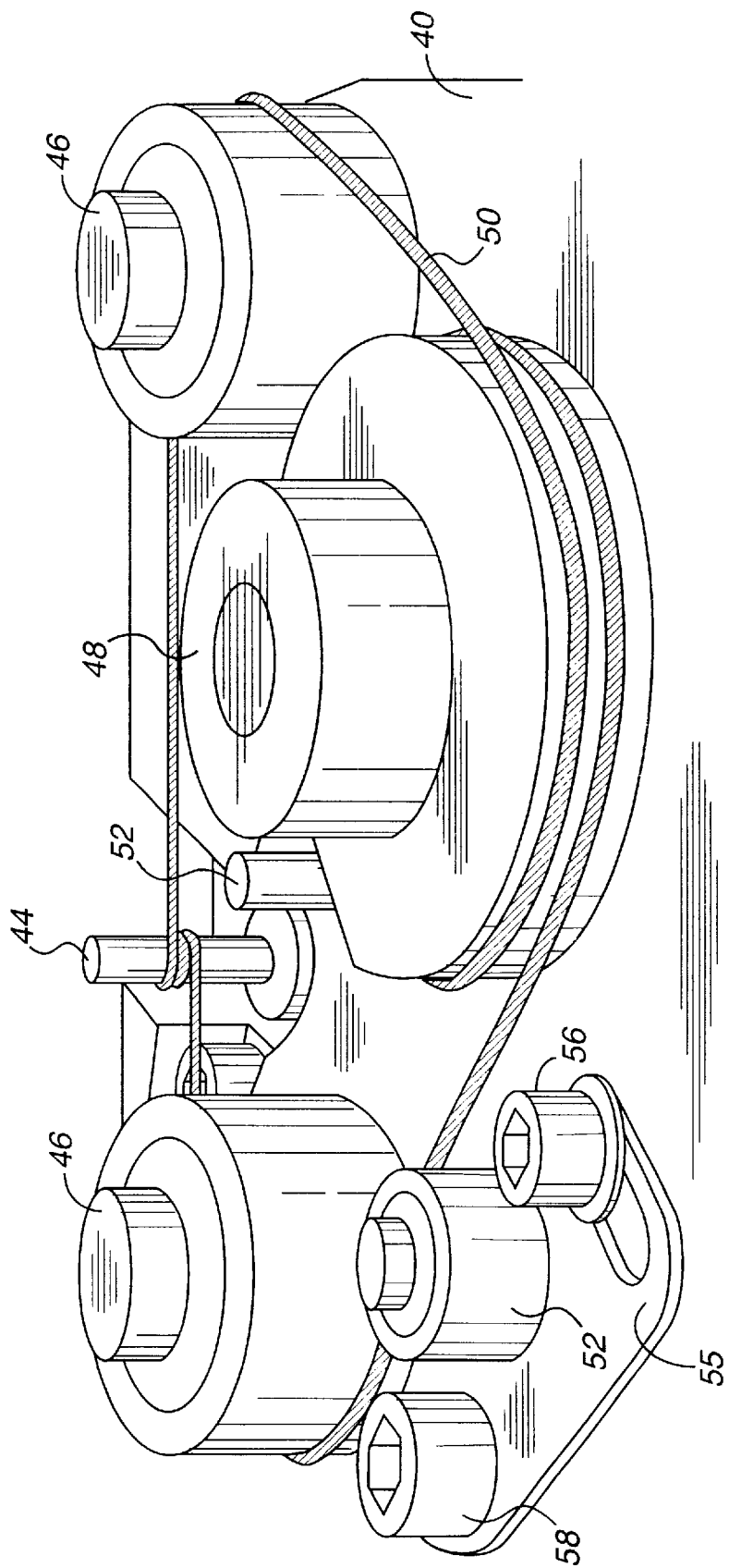
FIG. 4 is a rear perspective view of the embodiment shown in FIG. 3.
Figure 5:
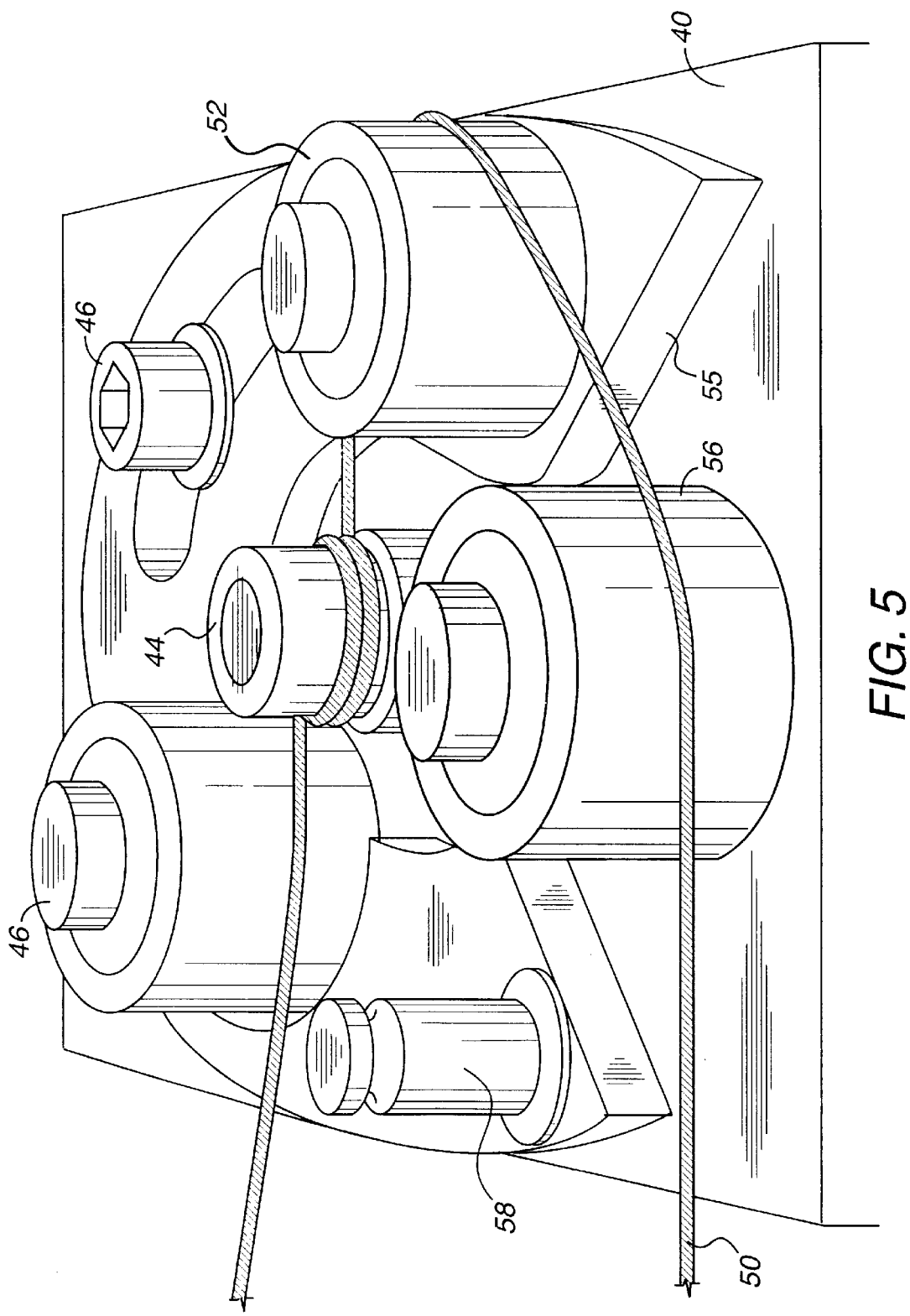
FIG. 5 is a perspective view of a second present preferred embodiment of the precision cable drive.

In another preferred embodiment of the invention, one of the idler pulleys 46 used in the embodiment of FIGS. 3 and 4 may be eliminated by aligning the second idler pulley 46, motor drive shaft 44, and drive pulley 48 along a straight line that is tangent to all three. It will be necessary, of course, that idler pulley 46 and drive pulley 48 be located on opposite sides of motor shaft 44, such that no radial forces are imparted to the motor shaft when the cable is placed under tension. This embodiment is shown in FIG. 5.

Although we have shown certain present preferred embodiments of our precision drive cable system and its use in a compact image steering and focusing device, it should be distinctly understood that our invention is not limited thereto but may be variously embodied within the scope of the following claims.

We claim:

1. A drive system for providing precise rotational motion comprising:

a. a rigid frame defining a hole therein;

b. a servo motor having a shaft, said motor attached to said frame such that said shaft protrudes through said hole defined in said frame and the motor being controlled by a feedback control system that utilizes at least one incremental encoder;

c. a first idler pulley, mounted on said frame adjacent said shaft of said motor;

d. a second idler pulley, mounted on said frame adjacent said shaft of said motor, opposite said first idler pulley, wherein said first pulley, said second pulley, and said shaft are spatially arranged so as to be tangentially aligned along a straight line;

e. a drive pulley, disposed such that said drive pulley rotates less than 360 degrees in either direction;

f. a cable, arranged in a path around said drive pulley, said first and second idler pulleys and said motor shaft, such that a rotation of said motor shaft will cause said drive pulley to rotate, said cable having two ends and wherein both of said ends of said cable are attached to said drive pulley;

g. a tensioner, arranged at a point along said path between one of said first and second idler pulleys and said drive pulley, for providing tension to said cable; and h. a post, attached perpendicularly to said drive pulley, wherein both of said ends of said cable are attached to said post.

2. The drive system of claim 1 wherein said cable is composed of a polymer.

3. The drive system of claim 2 wherein said polymer has an elongation less than or equal to 5 percent.

4. The drive system of claim 2 wherein said polymer has a density of at least 0.95 grams per cubic centimeter.

5. The drive system of claim 2 wherein said polymer is configured as fibers and wherein said cable is composed of a plurality of said polymer fibers woven together.

6. The drive system of claim 2 wherein said polymer is polyethylene.

7. The drive system of claim 1 wherein said cable makes at least two full revolutions around said shaft.

8. The drive system of claim 1 wherein said tensioner is a pulley.

9. The drive system of claim 8 wherein said tensioner maintains a constant tension on said cable.

10. The drive system of claim 9 wherein said tension on said cable is adjustable.

11. The drive system of claim 9 wherein the longitudinal axis of said idler pulleys is held in a perpendicular relationship to said frame by one or more bearings when said tension is applied by said tensioner.

12. The drive system of claim 1 wherein no radial force is exerted on said shaft due to said tension applied by said tensioner.

13. The drive system of claim 1 wherein said ends of said cable are attached to said post by tying said ends of said cable to said post.

14. The drive system of claim 13 wherein said ends of said cable are tied to said post using an overhand loop knot.

15. The drive system of claim 1 wherein the ratio of shaft rotations to drive pulley rotations is approximately ten to 1.

16. The drive system of claim of claim 1 wherein said cable is arranged around the circumference of said drive pulley, further comprising at least one barb, extending from said circumference of said drive pulley, for keeping said cable aligned along said circumference thereof.

17. The drive system of claim 1 wherein said drive pulley is mounted on said frame.

18. The drive system of claim 1 wherein said frame is composed of aluminum.

19. The drive system of claim 1 wherein said frame is composed of plastic.

20. The drive system of claim 1 wherein said motor is a stepper motor.

21. The drive system of claim 1, wherein said drive pulley can be moved a minimum of one tenth of one degree.

22. A drive system for providing precise rotational motion comprising:
   a. a rigid frame defining a hole therein;
   b. a servo motor having a shaft, said motor attached to said frame such that said shaft protrudes through said hole defined in said frame and the motor being controlled by a feedback control system that utilizes at least one incremental encoder;
   c. a first idler pulley, mounted on said frame adjacent said shaft of said motor;
   d. a second idler pulley, mounted on said frame adjacent said shaft of said motor, opposite said first idler pulley, wherein said first pulley, said second pulley, and said shaft are spatially arranged so as to be tangentially aligned along a straight line;
   e. a drive pulley, disposed such that said drive pulley rotates less than 360 degrees in either direction and wherein the ratio of shaft rotations to drive pulley rotations is approximately ten to one;
   f. a cable, arranged in a path around said drive pulley, said first and second idler pulleys and said motor shaft, such that a rotation of said motor shaft will cause said drive pulley to rotate; and
   g. a tensioner, arranged at a point along said path between one of said first and second idler pulleys and said drive pulley, for providing tension to said cable.

23. The drive system of claim 22 wherein said cable is composed of a polymer.

24. The drive system of claim 23 wherein said polymer has an elongation less than or equal to 5 percent.

25. The drive system of claim 23 wherein said polymer has a density of at least 0.95 grams per cubic centimeter.

26. The drive system of claim 23 wherein said polymer is configured as fibers and wherein said cable is composed of a plurality of said polymer fibers woven together.

27. The drive system of claim 23 wherein said polymer is polyethylene.

28. The drive system of claim 22 wherein said cable makes at least two full revolutions around said shaft.

29. The drive system of claim 22 wherein said tensioner is a pulley.

30. The drive system of claim 24 wherein said tensioner maintains a constant tension on said cable.

31. The drive system of claim 30 wherein said tension on said cable is adjustable.

32. The drive system of claim 30 wherein the longitudinal axis of said idler pulleys is held in a perpendicular relationship to said frame by one or more bearings when said tension is applied by said tensioner.

33. The drive system of claim 22 wherein no radial force is exerted on said shaft due to said tension applied by said tensioner.

34. The drive system of claim 22 where said cable has two ends and wherein both of said ends of said cable are attached to said drive pulley.

35. The drive system of claim 34 further comprising a post, attached perpendicularly to said drive pulley, wherein both of said ends of said cable are attached to said post.

36. The drive system of claim 35 wherein said ends of said cable are attached to said post by tying of said ends of said cable to said post.

37. The drive of claim 36 wherein said ends of said cable are tied to said post using an overhand loop knot.

38. The drive system of claim 34 wherein said cable is arranged around the circumference of said drive pulley, further comprising at least one barb, extending from said circumference of said drive pulley, for keeping said cable aligned along said circumference thereof.

39. The drive system of claim 22 wherein said drive pulley is mounted on said frame.

40. The drive system of claim 22 wherein said frame is composed of aluminum.

41. The drive system of claim 22 wherein said frame is composed of plastic.

42. The drive system of claim 22 wherein said motor is a stepper motor.

43. The drive system of claim 22 wherein said drive pulley can be moved a minimum of one tenth of one degree.

44. A drive system for providing precise rotational motion comprising:
   a. a rigid frame defining a hole therein;
   b. a servo motor having a shaft, said motor attached to said frame such that said shaft protrudes through said hole defined in said frame and the motor being controlled by a feedback control system that utilizes at least one incremental encoder;
   c. a first idler pulley, mounted on said frame adjacent said shaft of said motor;
   d. a second idler pulley, mounted on said frame adjacent said shaft of said motor, opposite said first idler pulley, wherein said first pulley, said second pulley, and said shaft are spatially arranged so as to be tangentially aligned along a straight line;
   e. a drive pulley, disposed such that said drive pulley rotates less than 360 degrees in either direction;

f a cable, arranged in a path around said drive pulley, said first and second idler pulleys and said motor shaft, such that a rotation of said motor shaft will cause said drive pulley to rotate, said cable having two ends and wherein both of said ends of said cable are attached to said drive pulley, further wherein said cable is arranged around the circumference of said drive pulley, further comprising at least one barb, extending from said circumference of said drive pulley, for keeping said cable aligned along said circumference thereof; and g. a tensioner, arranged at a point along said path between one of said first and second idler pulleys and said drive pulley, for providing tension to said cable.

45. The drive system of claim 44 wherein said cable is composed of a polymer.

46. The drive system of claim 25 wherein said polymer has an elongation less than or equal to 5 percent.

47. The drive system of claim 45 wherein said polymer has a density of at least 0.95 grams per cubic centimeter.

48. The drive system of claim 45 wherein said polymer is configured as fibers and wherein said cable is composed of a plurality of said polymer fibers woven together.

49. The drive system of claim 45 wherein said polymer is polyethylene.

50. The drive system of claim 44 wherein said cable makes at least two full revolutions around said shaft.

51. The drive system of claim 44 wherein said tensioner is a pulley.

52. The drive system of claim 51 wherein said tensioner maintains a constant tension on said cable.

53. The drive system of claim 52 wherein said tension on said cable is adjustable.

54. The drive system of claim 53 wherein the longitudinal axis of said idler pulleys is held in a perpendicular relationship to said frame by one or more bearings when said tension is applied by said tensioner.

55. The drive system of claim 44 wherein no radial force is exerted on said shaft due to said tension applied by said tensioner.

56. The drive system of claim 44 further comprising a post, attached perpendicularly to said drive pulley, wherein both of said ends of said cable are attached to said post.

57. The drive system of claim 44 wherein said ends of said cable are attached to said post by tying of said ends of said cable to said post.

58. The drive of claim 57 wherein said ends of said cable are tied to said post using an overhand loop knot.

59. The drive system of claim 44 wherein the ratio of shaft rotations to drive pulley rotations is approximately ten to 1.

60. The drive system of claim 44 wherein said drive pulley is mounted on said frame.

61. The drive system of claim 44 wherein said frame is composed of aluminum.

62. The drive system of claim 44 wherein said frame is composed of plastic.

63. The drive system of claim 44 wherein said motor is a stepper motor.

64. The drive system of claim 44 wherein said drive pulley can be moved a minimum of one tenth of one degree.

* * * * *